United States Patent [19]
Chadwick

[11] 3,737,763
[45] June 5, 1973

[54] VOLTAGE DISTORTION DETECTION AND CONTROL FOR HVDC CONVERTER

[75] Inventor: Philip Chadwick, Media, Pa.

[73] Assignee: General Electric Company, Philadelphia, Pa.

[22] Filed: Apr. 13, 1972

[21] Appl. No.: 243,748

Related U.S. Application Data

[63] Continuation of Ser. No. 144,017, May 17, 1971, abandoned.

[52] U.S. Cl. ........................... 321/11, 321/5, 321/13, 321/38, 321/40
[51] Int. Cl. ........................... H02m 1/08, H02m 7/48
[58] Field of Search ........................ 321/5 A, 5 E, 11, 321/12, 13, 38, 40, 42

[56] References Cited

UNITED STATES PATENTS

| | | | |
|---|---|---|---|
| 3,399,337 | 8/1968 | Stone | 321/5 A |
| 3,465,234 | 9/1969 | Phadke | 321/5 E |
| 3,466,525 | 9/1969 | Ainsworth | 321/5 A |
| 3,536,985 | 10/1970 | Ekstrom | 321/40 |
| 3,551,778 | 12/1970 | Ekstrom | 321/38 |
| 3,582,755 | 6/1971 | Ekstrom et al. | 321/40 X |

FOREIGN PATENTS OR APPLICATIONS

| | | | |
|---|---|---|---|
| 1,124,263 | 8/1968 | Great Britain | 321/40 |
| 1,230,974 | 5/1971 | Great Britain | 321/40 |

OTHER PUBLICATIONS

IEEE Trans. On Power Applications and Systems "A Refined HVDC Control System" Vol. PAS-89, No. 5/6 May/June 1970; pgs. 723-732.

Primary Examiner—Gerald Goldberg
Attorney—J. Wesley Haubner, Albert S. Richardson, Jr., Frank L. Neuhauser et al.

[57] ABSTRACT

A method and apparatus for controlling line voltage commutated, thyristor bridge power converters operated in the inverting mode comprising sampling the value of the thyristor valve commutating voltage appearing across the respective thyristor valves at a particular point in a cycle in advance of commutation, comparing the instantaneous value of a freshly sampled thyristor valve voltage to a stored value of the valve voltage of the previously conducting thyristor valve, detecting any difference between the instantaneous and stored values of valve voltage for use as an output error control signal, and directly applying the output error control signal back to control the firing angle of advance $\beta$ of the next thyristor valve to fire in the power converter. The power converter is normally controlled by a main or normal control regulation loop having a relatively slow speed of response and the output error control signal from the comparison circuit is supplied back directly in parallel with and in addition to the normal control regulation loop as a fast responding control capable of controlling the firing angle of advance $\beta$ of the next thyristor valve to be rendered conductive in the power converter.

14 Claims, 3 Drawing Figures

VOLTAGE DISTORTION DETECTION AND CONTROL FOR HVDC CONVERTER

This is a continuation of my U.S. application Ser. No. 144,017 filed May 17, 1971 and now abandoned.

BACKGROUND OF INVENTION

This invention relates to a novel voltage distortion detection and control circuit for use with HVDC converters and the like.

More specifically, the invention relates to a fast acting detection and control circuit for sensing the presence of transient disturbances reflected in the form of voltage distortion on the AC system side of a HVDC line voltage commutated thyristor bridge power converter. Such voltage distortion normally would affect adversely the commutation voltage available to commutate a previously conducting thyristor valve while the converter is operated in the inverting mode. By detecting such voltage distortion on the available commutating waveform and rapidly advancing the firing angle of advance $\beta$ for the next thyristor valve to be fired in the converter, the risk of commutation failure can be minimized.

PRIOR ART PROBLEMS

In almost all alternating current systems it is a reasonable certainty that some transient disturbances in the form of harmonics, etc will appear in the system during normal operation periods. Upon these occassions, voltage distortion of the alternating current waveform results which may be of a magnitude sufficient to cause commutation failure of a line voltage commutated converter operating in the inverting mode on or near the minimum margin angle (e.g., operating on minimum margin angle control). To prevent such commutation failures upon the occurrence of such transient disturbances, the present valve voltage distortion detection and control circuit was devised.

SUMMARY OF INVENTION

It is therefor a primary object of the present invention to provide a novel voltage distortion detection and control circuit for use with HVDC converters and the like; however, while the circuit is described as being designed primarily for use with HVDC power converters, it is in no way limited to such use and may be employed with other types of thyristor power converters such as reversible rolling mill drive controls, etc.

A further object of the invention is to provide a novel voltage distortion and control circuit for power converters which is fast acting in response to the occurrence of transient disturbances on the AC system and rapidly advances the firing angle of advance $\beta$ for the next thyristor valve to be fired in the power converter bridge subsequent to detection of the AC system voltage waveform distortion. In this manner severe reductions in commutating voltage are anticipated and commutation is begun soon enough to provide an extra long commutation interval and still leave an adequate margin angle that assures safe turn-off of the next thyristor valve to be commutated off.

In practicing the invention a method and apparatus for controlling line voltage commutated, thyristor bridge power converters of the type comprising a plurality of successively conducting thyristor valves and operated in the inverting mode, is described. The method and apparatus includes sampling the value of the thyristor valve commutating voltage appearing across the respective thyristor valves at a particular point at a cycle in advance of commutation. The instantaneous value of a freshly sampled thyristor valve voltage is then compared to a stored value of the valve voltage of the previously conducting (i.e., last-fired) thyristor valve, and any difference between the instantaneous and stored values of valve voltage is detected for use as an output error control signal. This output error control signal is directly applied back in parallel with and in addition to the normal control regulation loop of the power converter as a fast responding control capable of advancing the firing angle $\beta$ of the next thyristor valve to be fired in the bridge.

The voltage distortion detection and control circuit is comprised by valve voltage sampling means for sampling the value of the commutating voltage across the respective thyristor valves of the power converter bridge. Circuit means are provided for developing a sample point switching signal that is indicative of a particular point in the waveform of the thyristor valve commutating voltage where the value of the commutating voltage will be sampled. The value of the commutating voltage is stored from one thyristor valve firing interval to the next in a sample signal storage means through a suitable switching circuit means responsive to both the valve voltage sampling means and the sample point switching signal. A comparison circuit means is coupled to the valve voltage sample storage means (which comprises a capacitor) and also to the instantaneous output from the switching circuit means and serves to compare the instantaneous value of a sample valve voltage to the stored sample valve voltage of the previously conducting thyristor valve and to derive an output error signal indicative of any difference for use in controlling the operation of the power converter.

The power converter includes firing time computer means for supplying appropriately time firing signals to control conduction of respective thyristor valves in the bridge power converter. The firing time computer means includes controllable $\beta$ limit circuits for limiting the angle of advance $\beta$ of the thyristor valve to a normal $\beta_{MIN}$ value and the output error control signal is applied directly to the controllable $\beta$ limit circuit for directly increasing this value of the minimum $\beta$ limit of the next fired thyristor valve in the converter to which commutation proceeds. The increase in the firing angle of advance $\beta$ of the next thyristor valve to be rendered conductive in the converter is in proportion to the value of the output error control signal derived from the comparison circuit means. The control provided by the voltage distortion detection and control circuit is in parallel with and in addition to the normal control regulation loop for controlling operation of the firing time computer at fast speeds of response in advance of the next valve firing. The minimum $\beta$ limit then is reduced back down to the normal $\beta_{MIN}$ value over a predetermined time constant within which the distortion condition normally should be cleared. Preferably, the circuit is designed for use with power converters at 60 cycles/sec and the means for developing a sample point switching signal comprises an auxiliary transformer coupled through tertiary windings to the power converter transformer and connected to supply a replica of the phase to phase commutating voltage displaced 120° in phase from the commutating voltage to be sampled as the sample point switching signal.

BRIEF DESCRIPTION OF DRAWINGS

Other objects, features, and many of the attendant advantages of this invention will be appreciated more readily as the same becomes better understood by reference to the following detailed description, when considered in connection with the accompanying drawings, wherein like parts in each of the several figures are identified by the same reference character, and wherein.

DETAILED DESCRIPTION OF PREFERRED EMBODIMENTS

Figure 1:
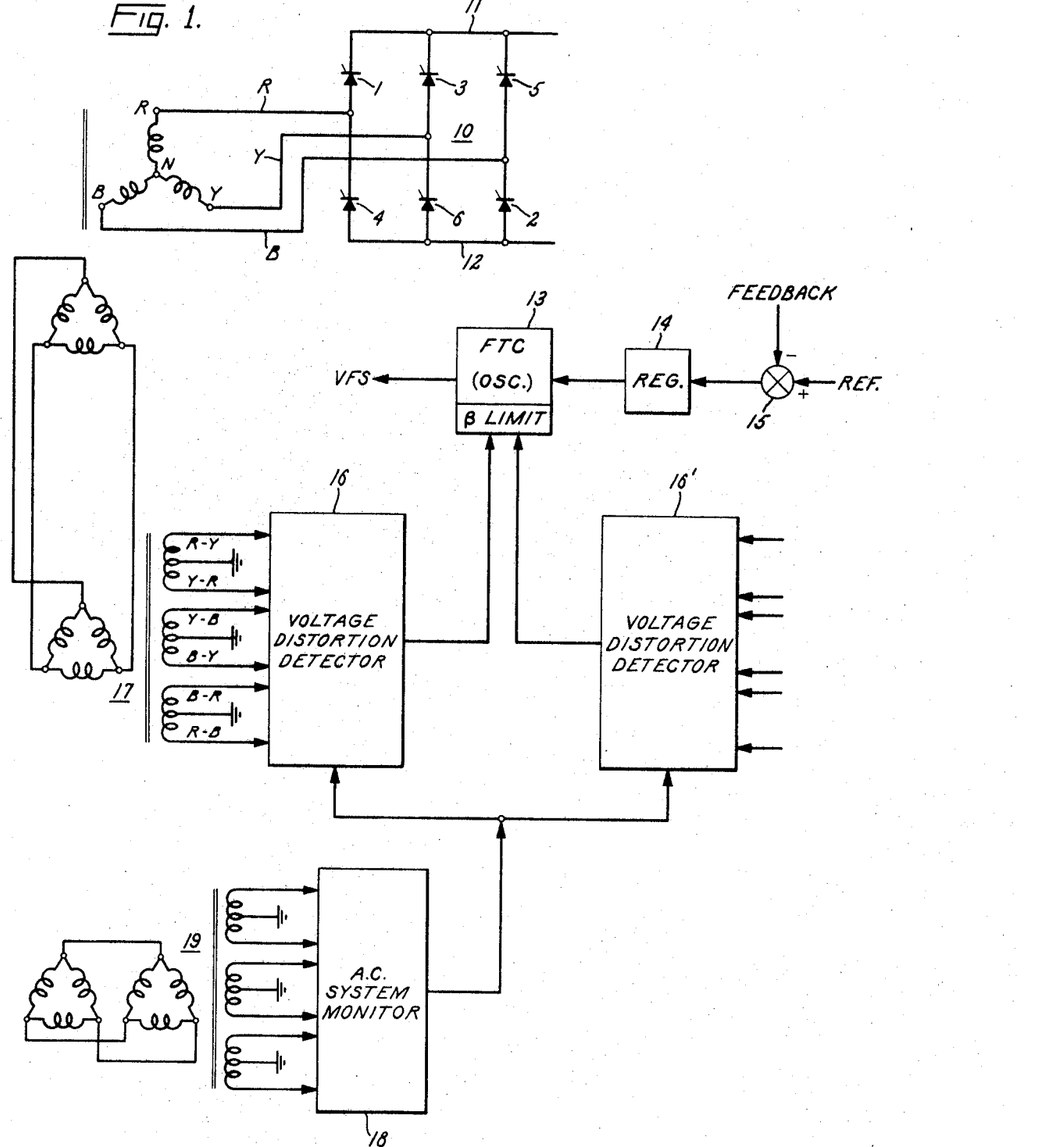
FIG. 1 is a functional block diagram of a voltage distortion detection and control circuit for use with line voltage commutated HVDC bridge power converters and the like, and constructed in accordance with the invention.

FIG. 1 is a functional block diagram of a novel AC system voltage distortion detection and control circuit for HVDC power converters and the like constructed in accordance with the invention. In FIG. 1, a line voltage commutated, transformer-coupled, thyristor bridge power converter 10 is shown at the upper portion of the figure. The converter includes a bridge comprised of six thyristor valves 1-6 connected in pairs between two direct current conductors 11 and 12 and a set of three-phase alternating current conductors R, B and Y. Conductors R, B and Y are connected to the phase windings R-N, Y-N and B-N of a three phase supply transformer (the primary winding of which is not shown) and which comprises a part of the AC system with which the HVDC power converter is used. The thyristor valves 1-6 are cyclically fired (rendered conductive or turned-on) in the numerical sequence indicated by their numbers and each valve comprises an ionic tube such as a thyratron, ignitron or the like or a solid state semiconductor valve such as a silicon controlled rectifier. Each of the valves 1-6 may comprise either an individual thyristor device or a plurality of such devices interconnected in series for high voltage and/or interconnected in parallel for high current, and whereso interconnected, are operated (rendered conductive) simultaneously in a manner known in the art. The power converter shown in FIG. 1 comprises a six-pulse bridge converter but, alternatively, may comprise a plurality of such bridges whose direct current terminals are interconnected in series and whose alternating current terminals are connected to appropriately phased power supply windings. Thus, a 12 pulse converter could be formed from two series connected six pulse bridges each similar to that shown in FIG. 1 and supplied with suitably phased alternating current potentials from star and delta transformer windings appropriately interconnected to provide a phase displacement of 30° between the respective $a$–$c$ terminals of the two bridges (in effect a six-phase transformer).

Figure 3:
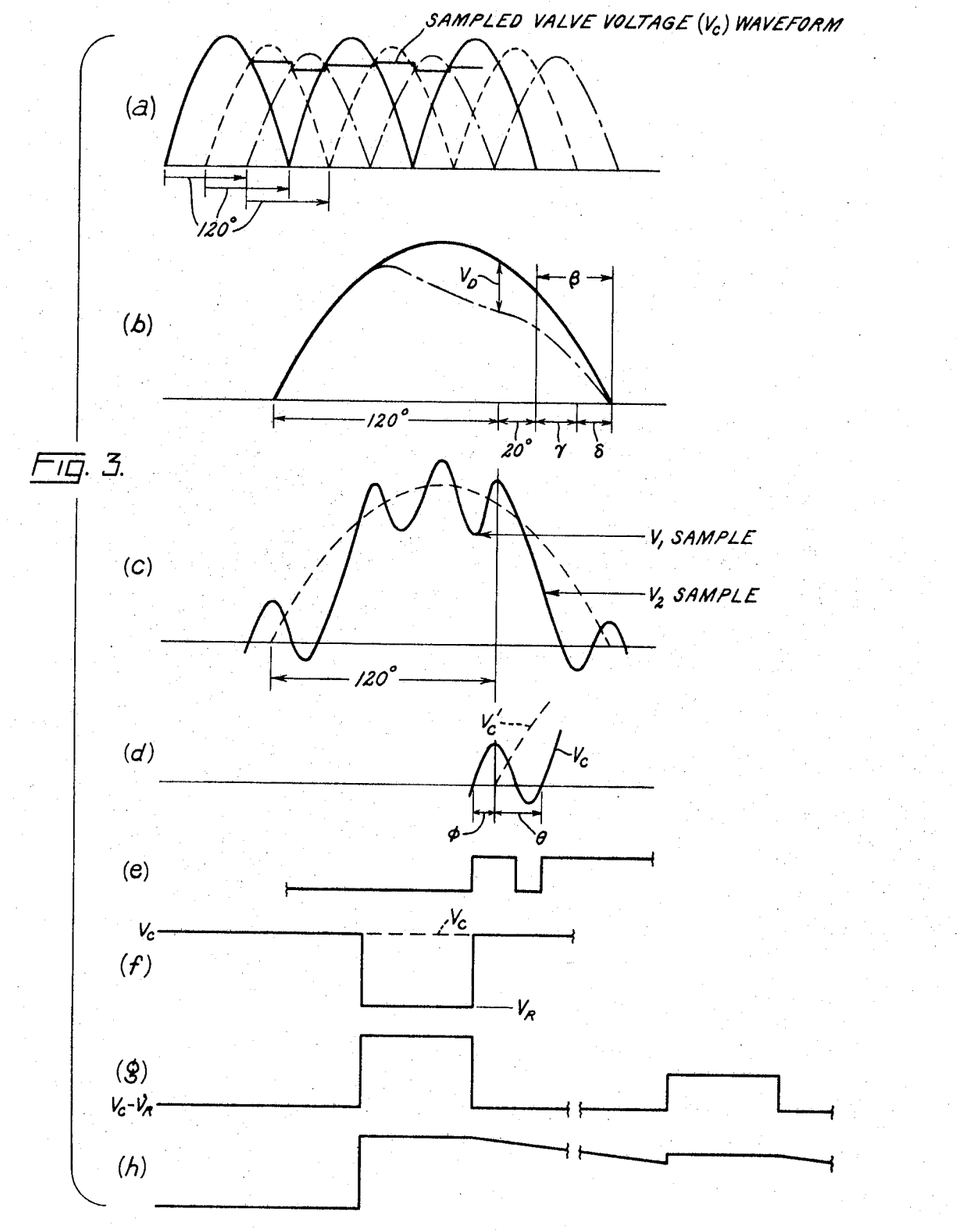
FIG. 3 is a series of voltage waveforms appearing at different points in the circuits of FIGS. 1 and 2, and illustrates the manner of operation of the invention.

For a more detailed description of the construction and operation of power converters of the type discussed above and shown at 10 in FIG. 1, reference is made to the textbooks entitled "High Voltage Direct Current Power Transmission" by C. Adamson and H. B. Hingorani (Garroway Ltd, London, 1960) and "Principles of Inverter Circuits" by B. D. Bedford and R. G. Hoft (John Wiley and Sons Inc, New York, 1964). Briefly however, it can be stated that the thyristor bridge power converter 10 is operated by controlling the timing of the firing pulses which cyclically are supplied to the gating means of the respective thyristor valves 1-6 to render them conducting in numerical sequence. The time at which a valve is fired relative to the recurrent instants of zero crossings of the phase-to-phase voltage that appears across it prior to conduction (which voltage is also called the commutating voltage and has the general waveform shown in FIGS. 3$a$ and 3$b$ as will be described more fully hereinafter) is known as the "firing angle." The firing angle can be expressed either as a "delay angle" alpha ($\alpha$) which is measured in electrical degrees from the zero crossing at which the fundamental commutating voltage of the valve becomes positive (i.e., anode becomes positive with respect to cathode), or alternatively as an "advance angle" beta ($\beta$) measured in electrical degrees ahead of the cyclically recurring instant at which the voltage waveform would have crossed zero and gone negative if the valve had not been fired. The firing angle is advanced by increasing $\beta$ and retarded by decreasing $\beta$. Commutation is the name given the transfer of load current from one valve (the relieved or outgoing valve) to the next-fired valve in the same half of the bridge (the relieving or incoming valve). With a delay angle $\alpha$ between zero and $\pi/2$, the power converter will be operated in the rectifying mode. If the angle of advance $\beta$ is in a range between zero and $\pi/2$ the power converter will operate in the inverting mode to supply electric power from the direct current source back into the alternating current system. The present invention is designed for use with power converters operated in the inverting mode and also may be used with any power inverter such as those employed for reversible rolling mill drives, standby power supplies, etc wherein AC system voltage distortion may be encountered, and the inverter is being operated on margin angle control.

The term "margin angle control" as used hereinafter is considered to by synonymous with the term "extinction angle control" and at this point in the development of the art, such controls are well known. See, for example, the article entitled "A New Constant Extinction Angle Control For AC/DC/AC Static Converters" by N. G. Hingorani and P. Chadwick — IEEE Transactions on Power Apparatus and Systems, Vol PAS – 87, No. 3, March 1968, Pgs 866–872. Briefly, however, margin angle control can be described as follows. For safe inverter operation, the angle of advance $\beta$ must be sufficiently great so that at the end of commutation the interval actually available between the cessation of conduction through the outgoing valve until the instant when that valve will again have to withstand a reapplied forward voltage is longer than a predetermined minimum time which is known in the art as the minimum critical deionization time (ionic tube) or reverse recovery time (thyristor valve). The interval referred to is commonly called the "margin angle" ($\delta$) of the outgoing valve, and as used herein the term margin angle is intended to be a measure of time, not degrees. In order to assure that none of the valves in the inverter prematurely breaks down and conducts when its forward voltage is reapplied, means for providing an adequate margin angle have been developed. One such margin angle control means is described in the above referenced Hingorani and Chadwick IEEE article. Typically these known margin angle controls are arranged to perform a regulating function so that the inverter operates with essentially a constant margin angle which is as small as possible with a suitable margin of safety. The present invention may be used with any known margin angle control. For that matter, the invention can be used with any known inverter firing angle control circuit wherein AC system voltage distortion presents a problem, but is intended primarily for use in conjunction with margin angle regulation where it is known that the AC system voltage distortion could cause commutation failure and unsatisfactory inverter operation.

The respective thyristor valves of converter 10 are sequentially fired by a family of firing pulses supplied to the control gates of the valves from a valve firing system (not shown) by a firing time computer (FTC) 13. The firing time computer comprises a variable frequency oscillator that is controlled by a regulator 14 and supplies properly timed control pulses to the valve firing system (VFS) for distribution to the control gates of the thyristor valves. The firing time computer 13 and regulator 14 may be of any known conventional type for deriving the required firing pulses whose angle of advance $\beta$ will normally depend upon the value of an input error control signal which controls the regulator. Preferably, however, FTC 13 and regulator 14 are of the type described in a U.S. patent application assigned to the General Electric Company (11LAO–3210–Pollard) pending concurrently herewith.

The regulator 14 is supplied with an input d.c. error control signal of varying magnitude from a summing junction 15 that has supplied to its input a feedback signal representative of the actual value of a quantity to be regulated and in addition a reference control signal which is representative of the desired value of that quantity. When operating in the inverter mode, constant margin angle regulation is ordinarily desired and the minimum value of the actual margin angle in the converter will determine the magnitude of the feedback signal, although on occasion the feedback signal may reflect the value of direct current flowing in the direct current transmission lines 11–12. Summing junction 15 sums together these two input controlling parameters and derives an output error control signal representative of any difference for controlling the operation of the regulator 14 and FTC 13. The control or regulation provided through summing junction 15, regulator 14 and FTC 13 is the main or normal control regulation loop and under normal operating conditions will properly control operation of the power converter by increasing or decreasing $\beta$ as necessary to maintain the regulated quantity (margin angle) at the desired constant value which the reference control signal determines. However, because of the design and characteristics of this normally used main control regulation loop, the control provided by this loop is relatively slow responding (extended over several thyristor valve conduction intervals) and hence may not be adequate to maintain stable operation of the converter in the presence of severe voltage distortion of the AC system voltage waveform.

The circuit shown in FIG. 1 is designed to immediately sense distortions in the AC system voltage and to quickly cause an increase in the angle of advance $\beta$ of the next thyristor valve to be fired in the bridge. This increase is achieved via the $\beta$ limit which immediately is moved out from the normal $\beta_{MIN}$ setting to a maximum value, and then is allowed to reduce back to the minimum value $\beta_{MIN}$ with any desired time constant. By thus immediately increasing the minimum $\beta$ limit up to its maximum value which is higher than the value of $\beta$ that the main regulation loop normally establishes the provision of an adequate margin angle to assure commutation of the then conducting thyristor valve, is assured. If the minimum $\beta$ limit then is allowed to reduce back to $\beta_{MIN}$ over some long time constant (e.g., 0.5 seconds for a 60 cycle system) the transient disturbance which caused the voltage distortion in the first instant will have had time to pass, and the AC system generally will have settled to a new steady state condition thereby enabling return to operation on margin angle control in which $\beta$ has whatever value is required to yield a minimum error control signal from the summing junction 15. The manner in which this is achieved will be described more fully hereinafter.

In order to detect the presence of distortion in the AC system voltage, voltage distortion detector means shown at 16 and 16' in FIG. 1, are provided. Both voltage distortion detectors 16 and 16' are identical in construction and operation, and hence only one is shown in greater detail in FIG. 2. The additional detector 16' is provided for use with a second 6 pulse bridge (not shown) which would be interconnected with the six pulse thyristor bridge converter 10 to form a combined 12-pulse converter. Where two such voltage distortion detector circuits 16 and 16' are employed with a 12-pulse converter, the outputs of the two detector circuits are OR-gated together at the input of the $\beta$ limit circuitry in the FTC 13 with the maximum distortion error signal being selected to control both bridges.

The construction and operation of the voltage distortion detector circuits 16 and 16' will be disclosed more fully hereinafter in conjunction with FIG. 2. At the present point in the description, however, it is sufficient to point out that the voltage distortion detector 16 is provided, with input, stepped down, commutating voltage sample signals indicated as R-Y, Y-R, Y-B, B-Y, B-R and R-B from the center tap secondary windings of an auxiliary transformer 17 whose primary winding is inductively coupled to the respective phase windings RN, BN and YN of the supply transformer comprising a part of the bridge converter 10. These input sample commutating signals are stepped down in magnitude but are representative of the phase to phase commutating voltage waveshapes appearing across the respective thyristor valves 1–6 when each of these valves is not conducting. Thus, it will be appreciated that the auxiliary transformer 17 comprises a valve voltage sampling means for sampling the value of the commutating voltage of the respective thyristor valves 1–6.

In addition to the respective thyristor valve voltages, voltage distortion detector 16 is supplied with sample point switching signals from the output of an AC system monitor 18 with the sample switching signals being displaced in phase 120° in the delayed direction with respect to the commutating voltage waveforms of the respective thyristor valves 1–6. The AC system monitor 18 comprises a second tertiary transformer 19 having its midtap grounded secondary windings appropriately interconnected through suitable level detecting and waveshaping circuits to the input to the voltage distortion detector 16. In a three phase alternating current system each of the phases is separated by 120°. Hence, identification of the 120° sampling point readily may be obtained by merely sensing the passage through zero of the phase voltage displaced by 120°, shape it, and apply it to detector 16 as the sample point switching signal. For this purpose, the primary winding of the auxiliary transformer 19 is connected to and supplied from appropriate tertiary windings inductively coupled to the three phase winding RN, BN and YN of the supply transformer comprising a part of the bridge power converter 10. For increased safety, two AC system monitors may be employed in place of one. In such case the redundant AC system monitors are cross connected so that the monitor for the primed bridge supplies detector 16 and the monitor for the unprimed bridge supplies detector 16'. With such an arrangement, should one set of monitors be taken out of service, the function could still be accomplished for the entire 12-pulse converter, although with some reduction in performance, by one voltage distortion detection circuit 16 or 16'.

The operation of the voltage distortion detection and control circuit shown in FIG. 1 can best be understood in connection with the waveforms shown in FIG. 3 of the drawings. FIG.3a illustrates a series of positive half cycles of phase to phase commutating voltages that appear across the respective thyristor valves of the power converter during the successive valve firings. As illustrated in FIG.3a, the value of the commutating voltage across the respective thyristor valves is periodically sampled at a sample point selected to be a point corresponding to 120° relative to each commutating voltage waveform. At each 120° sample point, the thyristor valve commutating voltage is sensed and stored on a capacitor. As will be described more fully hereinafter, at the instant of sampling, the instantaneous value of the sensed thyristor valve commutating voltage is compared to the value of the commutating voltage of the previously conducting thyristor valve. (The previously conducting valve is the one which in the normal firing sequence was turned on immediately preceding the valve whose commutating voltage is supplied.) If there is a substantial reduction in the newly sensed value, an output error control voltage is produced for use in controlling the converter. The voltage values appearing across the storage capacitor during sequential valve firings will appear as a somewhat stepped waveform signal as illustrated in FIG.3a.

FIG.3b of the drawings is a magnified view of the phase to phase commutating voltage waveform associated with a cooperating pair of the thyristor valves (e.g., valves 3 and 1) and depicts the need for the instant invention. The solid line waveform shown in FIG. 3 is the normal waveform of the commutating voltage under normal operating conditions. As explained more fully in the above identified Adamson and Hingorami text and in the IEEE article, the firing angle of advance β, which marks the point of ignition of the incoming thyristor valve of the pair whose commutating voltage is depicted, normally may be expected to be on the order of about 40° while operating the inverter under margin angle control. Upon firing the incoming valve 3, the commutating voltage causes load current to transfer from the cooperating outgoing valve 1 to the incoming valve in a known manner. The commutation angle γ would then be expected to extend over some 22° leaving a margin angle δ of about 18° for the outgoing valve to recover its blocking capability (during which interval the illustrated commutating voltage appears, with reverse polarity, across the outgoing valve 1). However, in the presence of an appreciable disturbance due to which the waveform of the commutating voltage may be distorted to appear in the manner shown in dotted outline form in FIG.3b and which is in excess of 15 percent below the normal voltage value at the 120° sampling point, a longer interval will be required for commutation and the margin angle δ may be insufficient to assure full reverse recovery by the outgoing valve. The reason for sampling the commutating voltage waveform at the 120° point now becomes apparent since it leaves an angle of about 20° within which a fast responding control can be operated to increase the angle of advance β sufficiently to accommodate the decreased voltage available for commutation off of the particular thyristor valve in question. The result of course will be to advance both the commutation angle γ and the margin angle δ so as to assure safe turn off of the then conducting or out going thyristor and avoid a commutation failure with consequent unsatisfactory operation of the converter. With the present circuit design, any distortion less than approximately 15 percent is considered negligible and no corrective action is taken by the system.

FIG.3c of the drawings illustrates another badly distorted commutating voltage waveform which may be caused by harmonics present on the AC system side of the converter. In this voltage waveform the idealized normal commutating voltage is illustrated in dotted outline form with the harmonically disturbed voltage waveform being shown in solid lines. Because of the presence of the harmonics, an output sample obtained at the 120° sampling point will be substantially above the expected or normal commutating voltage value that would be produced if the commutating voltage were undisturbed. Thus, if only this single sample were taken at the 120° point a badly wave such as shown in FIG.3c might go undetected. To avoid this possibility, the detection circuit performs multiple samplings of the valve voltage, such as at the depression point $V_1$ and at a later point $V_2$, and the latter sample provides a second chance to actuate the control to provide for an increased firing angle of advance β.

The manner in which multiple sampling of a badly distorted waveform such as shown in FIG.3c, is obtained, is best depicted in FIGS.3d and 3e. In FIG.3d, the waveform of the phase to phase voltage that is displaced 120° with respect to the commutating voltage of the valve in question, and hence the voltage that supplies the sample point switching signal, is illustrated in dotted outline form at $V'_C$. However, if instead of following this idealized commutating voltage waveform, because of the presence of harmonics, the wavey, solid line waveform shown at $V_C$ is followed, it will be seen that due to the harmonics multiple crossings of the zero voltage level in the positive going direction occur. The AC system monitor 18 employed in the voltage distortion detection and control circuit is the type utilizing a level detector for sensing the passage through zero in the positive going direction of this 120° phase displaced AC voltage. The output from the level detector is a squarewave-shaped signal whose leading edge is indicative of the point where the commutating voltage waveform passed through zero. Such AC system monitors are well known in the art and have been described in a number of publications such as in the above referenced Hingorani and Chadwick IEEE transaction. The resultant output switching signal from the AC system monitor will appear as shown in FIG.3e of the drawings wherein it can be seen that not one but two input switching signals will be supplied from the AC system monitor 18 to the voltage distortion detector 16 for badly distorted waveforms such as shown in FIG.3c. As a consequence, if an erroneously high sample value were established at the first sample point (which will be in the proximity of 120°) by the voltage distortion detection circuit, because of the double switching action obtained from the AC system monitor 18, a second sample $V_2$ will be obtained at a later point and in advance of the normal firing angle of advance $\beta$ so as to allow sufficient time for the control to correct for the badly distorted commutating voltage.

Figure 2:
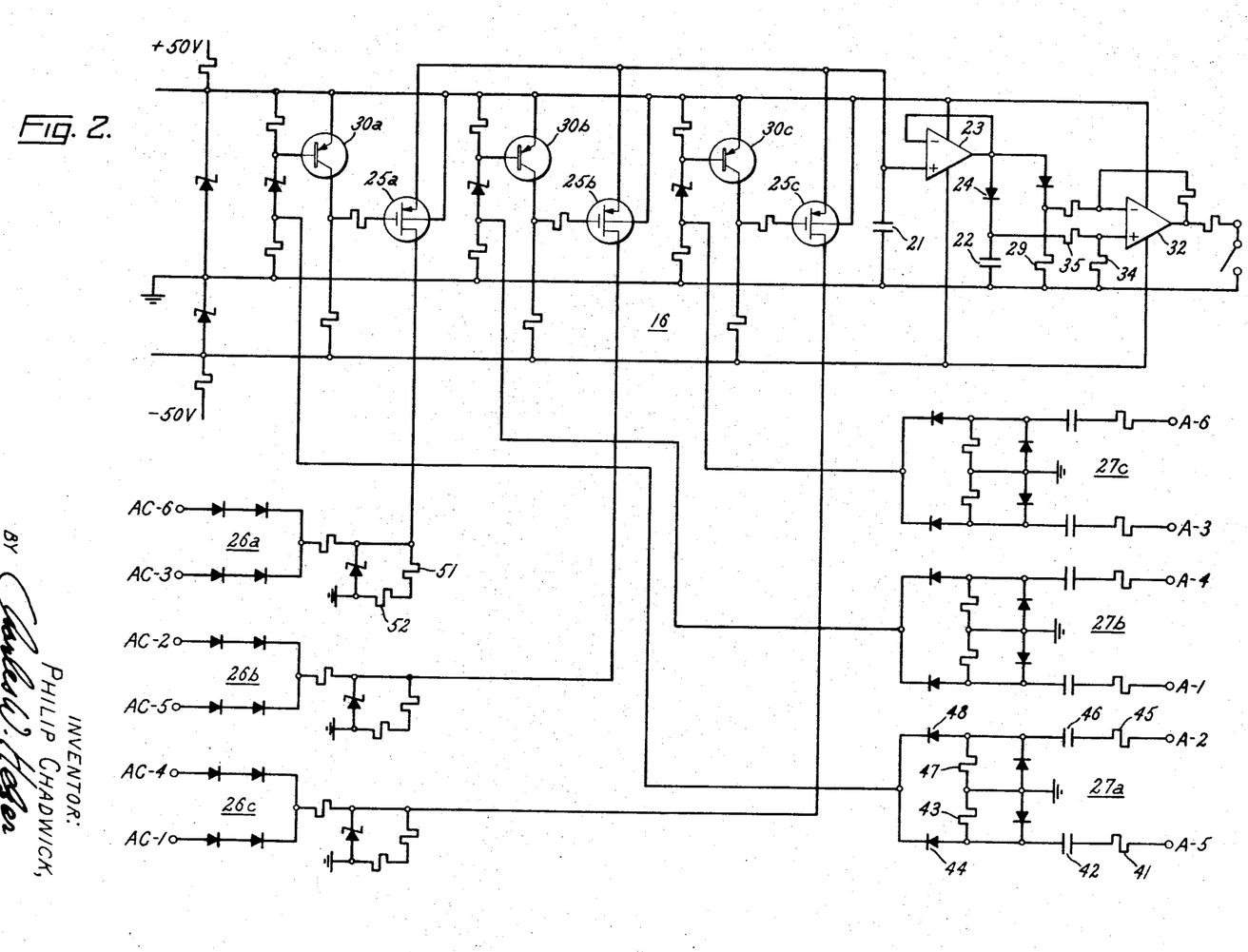
FIG. 2 is a detailed circuit diagram of a voltage distortion detection and comparison circuit comprising the heart of the invention.

FIG. 2 is a detailed circuit diagram showing the construction of a preferred form of the voltage distortion detector circuit 16 employed in the invention. This circuit is comprised by a thyristor valve voltage sample signal storage means comprised by a first storage capacitor 21 and a second storage capacitor 22 interconnected through a unity coupling circuit 23. The unity coupling circuit may be comprised by a conventional, commercially available integrated circuit, operational amplifier such as the 741 circuit chip manufactured and sold by the Fairchild Camera Company or some other similar integrated circuit, operational amplifier. The integrated operational amplifier 23 has its feedback circuit adjusted to provide unity gain and serves to couple the charge produced on capacitor 21 over to capacitor 22 through a blocking diode 24 that traps and stores the charge on capacitor 22.

The first storage capacitor 21 has one of its plates connected directly to a grounded terminal with the remaining plate being connected in common to the source electrodes of a plurality of bidirectional, field effect switching transistors 25a, 25b and 25c that coact with capacitors 21 and 22 and amplifier 23 as a conventional three input sample-hold circuit. A set of three dual, half-wave rectifying circuits 26a, 26b and 26c which full wave rectify the commutating voltages of the respective valve pairs, are connected to the drain electrodes of switching transistors 25a, 25b and 25c respectively, through resistive coupling networks that attenuate the valve voltage samples AC-1 through AC-6 supplied to the switching transistors down to a predetermined level. The phase to phase commutating voltage samples AC-1 through AC-6 obtained from the respective center-tapped secondary windings of the auxiliary transformer 17 shown in FIG. 1 are applied to the respective dual halfwave rectifiers 26a–26c as inputs.

The sample point switching signals obtained from the AC system monitor 18 in FIG. 1 are supplied to the gate electrodes of the respective switching transistors 25a–25c via inverting driver transistors 30a, 30b and 30c through dual halfwave rectifier level sensing and wave shaping circuits $27_a$, $27_b$ and $27_c$ connected to appropriate outputs. $A_1$ through $A_6$ from the center-tapped secondary windings of auxiliary transformer 19 in FIG. 1. In this manner, the gates of the switching field effect transistors 25a–25c are supplied with switching signals derived from those phase to phase voltages which are respectively displaced 120° in phase from the commutating voltages being sampled. Since in either a six pulse thyristor bridge converter or a twelve pulse converter there will be a thyristor valve commutating voltage waveform which will be displaced substantially 120° in phase from the commutating voltage of any particular thyristor valve to be commutated off, it is necessary merely only to sense and shape the leading edge of that voltage for use as a sample point identifying switching signal.

The sensed switching potentials $A_1$ through $A_6$ derived from transformer 19 via the AC system monitor 18 are supplied through level sensing and shaping circuits 27a, 27b and 27c, respectively. Each of these level sensing and shaping circuits, for example 27a, is comprised by a resistor 41, capacitor 42, resistor 43 and diode 44 arranged to produce a constant amplitude positive pulse of about 10 microseconds duration at the leading edge of the input signal voltage from the transformer 19 secondary as the voltage passes through zero in the positive going direction as depicted in FIGS.3d and 3e. Of course, if only a single passage through zero occurs, only a single pulse will be produced, and this will be at the 120° sampling point under normal operating conditions with no AC system distortion. This input (labeled $A_5$) occurs at the 120° sampling point for thyristor valve 3. Similarly, resistors 45 and 47, capacitor 46 and diode 48 develop a positive switching pulse at the leading edge of input $A_2$ which is in direct antiphase to input $A_5$ and provides the 120° sampling point for thyristor valve 6. These positive pulses associated with inputs $A_5$ and $A_2$ are passed in an OR manner to momentarily turn off transistor 30a. Similar arrangements are provided for AC system monitor inputs $A_1$, $A_4$ and $A_3$, $A_6$ to drive transistors 30b and 30c, as shown. Thus 30a, 30b and 30c are each turned off momentarily twice per cycle of commutating voltage, phased 60° apart in sequence.

During the short interval of time (10 microseconds) that transistor 30a is turned off, switching transistor 25a is turned on and capacitor 21 assumes the instantaneous voltage across resistors 51 and 52 at the output from resistive coupling circuit 26a. In this manner the commutating voltages for valves 3 and 6 are sampled at $\alpha=120°$, which for a firing angle $\beta=40°$, is 20° before the firing point of the valve. Operation of transistors 30b and 30c afford similar samplings of commutating voltages for valves 2,5, and 1, 4, respectively. Therefore capacitor 21 and 22 store for a 60° period the instantaneous commutating voltages at $\alpha=120°$ for valves 1 through 6 in sequence. FIG. 3(a) illustrates the capacitor 22 voltage for magnitude unbalance of the three phase AC system voltage. Under balanced magnitude conditions, the capacitor voltage would be a constant value, since all commutating voltages will have the same magnitude at their own 120° points.

FIG. 3(c) shows the commutating voltage waveform for one of the valves (for example valve 3) under severe harmonic content conditions, such that multiple zero crossings are apparent. The corresponding AC system monitor output $A_5$ is shown in FIG.3(e) which is produced as a result of conditions on valve 5 commutating voltage i.e., the valve whose commutating voltage is displaced 120° from valve 3). The effect of the double pulse output from the AC system monitor, is to cause a double sampling of the concerned commutating voltage at points wt.=120°−0 and wt. = 120° + $\theta$. (The sum of $\phi + \theta$ equals the degrees between the two positive going zero crossings of valve 5 commutating voltage). Generally, there will be some magnitude difference between the sampled voltages at these two points, and as will become apparent later, for sufficient differences in magnitude the circuit will effect similar protective measures as for the case of general reductions in AC system voltage.

Under normal AC system conditions, capacitor 22 and resistor 29 have almost identical voltages across them as a result of the sampled voltage at the points wt. = 120° of the commutating voltages. However, when a reduction in such voltages occurs, diode 24 becomes reverse biassed since capacitor 22 discharges only at a slow rate (T = 150 microseconds) set by resistors 34 and 35. The voltage across resistor 29 follows the sampled voltage. Thus an error voltage is apparent between the differential inputs of amplifier 32, being given instantaneously by the reduction in voltage at the particular wt. = 120° sampling point from the previously highest voltage at such sampling points. Therefore, the output of amplifier 32 goes from its previous value of approximately zero volts to some positive value, proportional to this error signal by the gain of this stage.

If at the next instant of sampling, the voltage is greater or equal to the previous highest voltage stored on capacitor 22, the error signal, hence amplifier 32 output, will revert to zero. However, if the sampled voltages continue to reduce consecutively over some period determined by the duration of the disturbance, an error signal will exist continuously over this period, causing amplifier 32 output to remain positive over such a period. In either case, the particular input to the $\beta$ limit circuit of FTC 13 has a time constant of 50 milliseconds associated with a diode capacitor storage arrangement similar to that of diode 24 and capacitor 22. The effect of this arrangement is to cause the $\beta_{MIN}$ limit to be reduced from its new high value to its nominal setting with a time constant of 50 milliseconds; constant margin angle control then being resumed as the $\beta_{MIN}$ limit is reduced toward the $\beta$ value required for margin angle control. In addition a maximum value of $\beta_{MIN} = 55°$ is enforced in the $\beta$ limit selector circuit.

FIG.3f of the drawings illustrates the manner of operation of the summing amplifier 32. Initially, assuming that there has been no distortion in the waveform of the AC system voltage, the value of the voltage stored on capacitors 21 and 22 will be represented by the voltage level $V_C$. For so long as this condition persists, $V_C$ will remain essentially constant at the instant of sampling, and the instantaneous input supplied from across resistor 22 is appropriately scaled to result in a zero output signal from summing amplifier 32 under this condition. However, upon the occurrence of a distortion in the voltage waveform such as is depicted at $V_D$ in FIG. 3b or $V_2$ in FIG. 3c, the instantaneous value of the sampled voltage $V_R$ will drop below $V_C$ in the manner shown in FIG. 3f. The summing amplifier 32 will then have supplied to its input a difference signal $V_C-V_R$ depicted in FIG. 3g of the drawings.

The nature of the error control signal applied to the $\beta$ limit circuit, is illustrated in FIG. 3h of the drawings which is somewhat exaggerated for convenience in viewing and wherein it will be seen that the highest value of the difference between the valve voltage sample stored on capacitor 24 and the instantaneous sample voltage will decay toward zero at the time constant T (50 milliseconds). So long as the output error control signal is under a threshold level representative of the $\beta_{MIN}$ setting, the converter operates normally assuming that further voltage dips or unbalances do not appear again on the AC system. However, as indicated in FIGS. 3g and 3h, where the disturbance is sufficiently prolonged to affect the commutating voltage of the next succeeding thyristor valve to be fired, the error signal applied to the $\beta$ limit circuit will again be stepped up to a level determined by the magnitude of the unbalance. From that point it again will proceed to discharge down at the time constant T towards zero error output representative of the undistorted commutating voltage waveform condition and the $\beta$ limit circuit again assumes its $\beta_{MIN}$ setting. In this manner the firing angle of advance of the converter which operates under normal closed loop margin angle regulation for maximum efficiency under all normal operating conditions, is immediately increased up to the maximum value of $\beta_{MIN}$ in response to the detection of voltage distortion on the AC system. The extent that $\beta$ is advanced will be determined by the magnitude of the output error control signal.

The output error control signal from the voltage distortion detector circuit 16 is supplied directly to the $\beta$ limit circuitry of the FTC 13 in parallel with and in addition to the normal regulation loop provided through the summing junction 15 and regulator 14. As a consequence the voltage distortion detection and control circuit will be fast responding, and is capable of increasing the minimum $\beta$ limit of the very next thyristor valve to be fired in the power converter. Where a 12 pulse bridge arrangement is employed, the error signals from the two separate voltage distortion detection circuits 16 and 16' are OR gated through an appropriate OR gate included at the input of the $\beta$ limit circuit in FTC 13. The maximum error control signal then would be selected and applied to the $\beta$ limit circuit for controlling operation of the converter.

From the foregoing description, it will be appreciated that the present invention provides a novel voltage distortion detection and control method and circuit for use with HVDC converters and the like which is fast acting in response to the occurrence of transient disturbances on the AC system that result in distortion of the commutating voltage available for the thyristor valves of the converter. Upon detection of a voltage distortion condition, the invention rapidly advances the firing angle of advance $\beta$ of next thyristor valve in the converter to be fired thereby assuring an adequate margin angle and safe turn-off of the companion outgoing valve despite the anticipated reduction in its commutating voltage.

Having described one embodiment of a novel voltage distortion detection and control method and circuit for HVDC converters and the like constructed in accordance with the invention, it is believed obvious that other modifications and variations of the invention are possible in the light of the above teachings. It is therefore to be understood that changes may be made in the particular embodiment in the invention described which are within the full intended scope of the invention as defined by the appended claims.

What is claimed is:

1. A voltage distortion detection and control circuit for a line voltage commutated transformer-coupled thyristor bridge power converter comprised of a plurality of thyristor valves, said circuit including valve voltage sampling means for sampling the value of the commutating voltage across the respective thyristor valves of a power converter, means for developing a sample point switching signal indicative of a particular point in a thyristor valve commutating voltage waveform where the value of the commutating voltage will be sampled, valve voltage sample signal storing means, switching means responsive to said valve voltage sampling means and to said sample point switching signal and coupled to said sample signal storage means for sequentially supplying to said sample signal storage means the sampled voltage values of the respective thyristor valves, and comparison circuit means coupled to said signal storage means for comparing the instantaneous value of a sample valve voltage to the sample valve voltage value of the previously conducting thyristor valve and deriving an output error signal indicative of any difference for use in controlling the operation of the power converter.

2. A voltage distortion detection and control circuit according to claim 1 wherein the power converter is capable of operating in the inverting mode and includes firing time computer means for supplying appropriately timed firing signals to control conduction of the respective thyristor valves in the converter, said firing time computer means including controllable limit circuit means for limiting the firing angle of advance $\beta$ of the thyristor valves to a normal $\beta_{MIN}$ value, and wherein the output error control signal is applied to the controllable $\beta$ limit circuit means for immediately increasing the value of the minimum $\beta$ limit for the next thyristor valve in the converter to be rendered conductive.

3. A voltage distortion detection and control circuit according to claim 2 wherein the increase in the value of the minimum $\beta$ limit is in proportion to the value of the output error control signal.

4. A voltage distortion detection and control circuit according to claim 2 wherein the power converter includes a normal control regulation loop for controlling operation of the firing time computer and hence the firing of the thyristor valves of the converter to maintain a predetermined margin angle, the control loop provided through the voltage distortion detection and control circuit is parallel with and in addition to the normal control regulation loop and possesses a much faster speed of response, and circuit means are coupled to the voltage distortion and detection circuit for reducing the minimum $\beta$ limit back to the normal $B_{MIN}$ value within a predetermined time constant within which the distortion condition normally will have cleared.

5. A voltage distortion detection and control circuit according to claim 1 wherein the converter is designed for operation at 60 cycles/sec and the means for developing a sample point switching signal comprises tertiary transformer means coupled to the power converter transformer windings and connected to supply a replica of the commutating voltage displaced 120° in phase from the commutating voltage to be sampled, and level detecting and waveshaping monitor circuit means coupled to said tertiary transformer means for deriving the sample point switching signal in response to a zero crossing of said replica, whereby multiple output sample point switching signals are derived in the presence of harmonic distortions that cause multiple zero crossings of the commutating voltage waveform.

6. A voltage distortion detection and control circuit according to claim 5 wherein the power converter is capable of operating in the inverting mode and includes firing time computer means for supplying appropriately timed firing signals to control conduction of the respective thyristor valves in the converter, said firing time computer means including controllable $\beta$ limit circuit means for limiting the minimum firing angle of advance $\beta$ of the thyristor valves to a normal $\beta_{MIN}$ value, and wherein the output error control signal is applied to the controllable $\beta$ limit circuit means for rapidly increasing the minimum $\beta$ limit to a value higher than $\beta_{MIN}$.

7. A voltage distortion detection and control circuit according to claim 6 where the minimum $\beta$ limit is increased an amount proportional to the value of the output error control signal.

8. A voltage distortion detection and control circuit according to claim 7 wherein the power converter includes a normal control regulation loop for controlling operation of the firing time computer and hence the firing of the thyristor valves of the converter to maintain a predetermined margin angle, the control loop provided through the voltage distortion detection and control circuit is parallel with and in addition to the normal control regulation loop and possesses a much faster speed of response, and circuit means are coupled to the voltage distortion and detection circuit for reducing the firing angle of advance $\beta$ back to the value established by the normal control regulation loop within a predetermined time constant within which the distortion condition normally will have cleared.

9. A voltage distortion detection and control circuit according to claim 8 wherein the power converter is high voltage direct current (HVDC) power converter capable of converting alternating current to high voltage direct current while operated in the rectifying mode and capable of converting high voltage direct current to alternating current while operated in the inverting mode.

10. A voltage distortion and detection circuit according to claim 9 wherein the switching means comprises transistor switching means for each valve pair in the thyristor bridge power converter with each transistor switching means having at least two input terminals and an output terminal, the valve voltage sampling means for both thyristor valves in the pair being coupled to one input terminal, the sample point switching signal being supplied to the remaining input terminal, and the output terminal of all the transistor switching means being connected in common to the valve voltage sample signal storage means, wherein said valve voltage sample signal storage means comprises a first capacitor connected in common to all of the output terminals of the transistor switching means and a second storage capacitor coupled through a unity gain coupling circuit means to the first storage capacitor for storing a sampled thyristor valve voltage from one thyristor valve conduction interval to the next, and wherein said comparison circuit means comprises summing circuit means having one input coupled to said second storage capacitor and a second input coupled to the output from the unity gain coupling circuit means for summing together the instantaneous value of a freshly sampled thyristor valve voltage and the value of the voltage sample of the previously conducting thyristor valve stored on the second capacitor and deriving an output error signal indicative of any difference.

11. A voltage distortion and detection circuit according to claim 1 wherein the switching means comprises transistor switching means for each valve pair in the thyristor bridge power converter with each transistor switching means having at least two input terminals and an output terminal, the valve voltage sampling means for both thyristor valves in the pair being coupled to one input terminal, the sample point switching signal being supplied to the remaining input terminal, and the output terminal of all the transistor switching means being connected in common to the valve voltage sample signal storage means, wherein said valve voltage sample signal storage means comprises a first capacitor connected in common to all of the output terminals of the transistor switching means and a second storage capacitor coupled through a unity gain coupling circuit means to the first storage capacitor for storing a sampled thyristor valve voltage from one thyristor valve conduction interval to the next, and wherein said comparison circuit means comprises summing circuit means having one input coupled to said second storage capacitor and a second input coupled to the output from the unity gain coupling circuit means for summing together the instantaneous value of a freshly sampled thyristor valve voltage and the value of the voltage sample of the previously conducting thyristor valve stored on the second capacitor and deriving an output error signal indicative of any difference.

12. A voltage distortion detection and control circuit according to claim 11 wherein the converter is designed for operation at 60 cycles/sec and the means for developing a sample point switching signal comprises tertiary transformer means coupled to the power converter transformer windings and connected to supply a replica of the phase to phase voltage displaced 120° in phase from the commutating voltage to be sampled as the sample point switching signal.

13. A method of controlling line voltage commutated thyristor bridge power converters operated in the inverting mode and including a plurality of successively conducting thyristor valves, said method including sampling the value of the thyristor valve commutating voltage appearing across the respective thyristor valves at a particular point in a cycle in advance of commutation, comparing the instantaneous value of a freshly sampled thyristor valve voltage to a stored value of the valve voltage of the previously conducting thyristor valve, detecting any difference between the instantaneous and stored values of valve voltage for use as an output error control signal, and directly applying the output error control signal back to control the firing angle of the next thyristor valve to fire in the power converter.

14. A method according to claim 13 wherein the power converter being controlled includes a normal control regulation loop for normally controlling the firing angle $\beta$ of the converter to maintain a predetermined margin angle, the output error control signal is supplied back in parallel with and in addition to the normal control regulation loop as a fast responding control capable of advancing the firing angle $\beta$ of the next thyristor valve to be rendered conductive, and the firing angle $\beta$ subsequently is reduced back down to normal value over a predetermined time constant within which the distortion normally should clear.

* * * * *